US007034545B2

(12) United States Patent
Brown et al.

(10) Patent No.: US 7,034,545 B2
(45) Date of Patent: Apr. 25, 2006

(54) APPARATUS AND METHOD FOR MONITORING TRANSMISSION SYSTEMS USING OFF-FREQUENCY SIGNALS

(75) Inventors: Jeffrey M. Brown, Windham, ME (US); John L. Schadler, Raymond, ME (US); William A. DeCormier, Poland, ME (US); Andre J. Skalina, Portland, ME (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 10/747,158

(22) Filed: Dec. 30, 2003

(65) Prior Publication Data

US 2005/0140376 A1 Jun. 30, 2005

(51) Int. Cl.
*G01R 31/04* (2006.01)

(52) U.S. Cl. ...................................... 324/538; 324/642

(58) Field of Classification Search ........ 324/527–534, 324/538–544, 642; 379/26.01–26.02, 27.01–27.03
See application file for complete search history.

(56) References Cited

U.S. PATENT DOCUMENTS 3,651,403 A 3/1972 Fluck, Jr. ..................... 325/31
4,904,864 A 2/1990 Dakin et al. ................ 250/227
5,416,623 A 5/1995 Dawson et al. ............. 359/110
5,754,053 A * 5/1998 Bourdeau ................... 324/533
5,883,882 A * 3/1999 Schwartz .................... 370/243
2003/0189641 A1 10/2003 Skalina ....................... 348/192
2005/0054301 A1 3/2005 Brown et al. ............ 455/67.14

FOREIGN PATENT DOCUMENTS

WO WO 99/38023 7/1999

* cited by examiner

*Primary Examiner*—Vincent Q. Nguyen
(74) *Attorney, Agent, or Firm*—Baker & Hostetler LLP

(57) ABSTRACT

A monitoring system for an transmission line, such as a multi-channel television broadcasting antenna feed line, gathers data about the physical and electrical condition of the line in real time. The system can detect and localize deterioration and other time-dependent faults in the transmission line by the tendency of faults to produce reflections back to the transmitter that were not part of the original characterization of a particular installation. Some kinds of faults, identified early enough, can be corrected without replacing components, and especially without shutting down the transmission line during prime viewing hours. Other faults can be detected in time to order replacement parts before the underlying problem becomes severe, and to allow servicing during periods of low demand.

7 Claims, 3 Drawing Sheets

APPARATUS AND METHOD FOR MONITORING TRANSMISSION SYSTEMS USING OFF-FREQUENCY SIGNALS

FIELD OF THE INVENTION

The present invention relates generally to electromagnetic signal conveying transmission lines. More particularly, the invention relates to non-intrusive monitoring of the condition of transmission lines.

BACKGROUND OF THE INVENTION

It is known in radio frequency systems to use a coaxial or waveguide transmission line to propagate radio frequency (RF) signals from a signal source, such as from a broadcast transmitter to a broadcast antenna. A disadvantage of systems in current use is that a waveguide or transmission line can deteriorate gradually due to its exposure to a number of destructive factors, while the deterioration can continue undetected in normal use until a catastrophic failure reveals one or more problems. Since a transmission line may be used, for example, for broadcast of several communication channels using a shared, broad-band antenna system, it is possible for a multiplicity of channel transmissions to be rendered inoperable or degraded to a significant extent until repair parts can be procured and installed.

Destructive factors likely to contribute to harm to transmission lines over extended time periods can be, for example, galvanic corrosion; cold flow under bolts caused by repeated temperature swings; metal fatigue associated with repeated mechanical stress cycling; exposure to chemically reactive pollutants; exposure to airborne salt; exposure to water condensed inside the transmission line due to temporary loss of pressurization or dehumidification; and hidden workmanship errors such as pinched O-rings or pinhole flaws in the materials from which the transmission line is constructed.

These and many other factors can lead to significant increases in voltage standing wave ratio (VSWR), high voltage breakdown, and other faults demanding immediate attention. VSWR increases stemming from such degradation can manifest suddenly due to events such as storm stress on deteriorated materials, or can manifest gradually in the form of cumulative degradation in performance over a protracted period. Both problem modalities can require extensive efforts simply to identify and localize a single-point failure even after it has occurred. Multiple-point degradations can likewise become established, requiring prolonged and potentially ineffective troubleshooting.

A typical operator response to prevent the escalation of some of these problem modalities is the reduction in output power, resulting in loss of reception for the furthest customers and degraded reception for those nearer. Even this response is not diagnostic, so it is still necessary to identify the failure that caused the system fault. A time consuming diagnostic procedure can ensue, leading to the development of a corrective action plan, which may involve shutting down a multi-channel broadcast facility for an extended period during prime viewing hours, switching over to a reduced-performance backup system for an indefinite servicing period, or another method, any of which can potentially entail significant contract violations and incur financial penalties.

Accordingly, there is a need for a diagnostic apparatus and method that can be applied non-intrusively to provide detection of degradation taking place in a transmission line.

SUMMARY OF THE INVENTION

The foregoing needs are met, at least to a great extent, by the present invention, which in some embodiments provides a detective and diagnostic apparatus and method that can be applied non-intrusively and continuously to provide prompt detection of degradation taking place in a transmission line. The detection and diagnostic process may include identification of the locus of each potential failure mode in the transmission line system.

In accordance with one embodiment of the invention, an electromagnetic signal transmission line test system is provided, comprising a transmission line capable of carrying an electromagnetic signal from a source site to a destination site, an electromagnetic test signal source capable of generating an electromagnetic test signal sufficiently different in frequency from the source site signal, and a signal combiner/splitter capable of combining the test signal into the transmission line, wherein said signal combiner/splitter is located proximate to one end of said transmission line, and wherein said signal combiner/splitter provides, as an electrical output, test signals that have been reflected from loci within said transmission line.

In accordance with another embodiment of the invention, an electromagnetic signal transmission line tester is provided, comprising directing means for directing an electromagnetic signal from an electromagnetic signal source to a load, test signal means for producing an electromagnetic test signal independent of other electromagnetic signals present within said directing means, combining/splitting means for combining the test signal into the directing means and splitting the test signal from the directing means, and detecting means for detecting energy from a reflected test signal from the directing means, wherein the test signal is of a different frequency than the other electromagnetic signals present within said directing means and of a sufficiently low amplitude to not require FCC broadcast licensing approval.

In accordance with yet another embodiment of the invention, a method of testing a transmission line is provided, comprising the steps of transmitting an out-of-channel test signal into the transmission line with a combining/splitting system located proximate to one end of the transmission line, receiving reflections of the test signal from the transmission line with said combining/splitting system, processing the received reflections to establish a first pattern of time intervals from the original test signal to each reflection, and comparing the first pattern of time intervals of received reflections to a predetermined reflection pattern thereof.

There have thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiments of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

In accordance with some embodiments, the present invention provides a detective and diagnostic apparatus and method that can be applied non-intrusively and continuously to provide prompt detection of degradation taking place in a transmission line, to include as necessary identification of the locus of each of a number of potential or actual failure modes within the transmission line system.

In accordance with some embodiments of the invention, a sensing apparatus detects the fine detail of radio frequency (RF) reflections from a degraded transmission line due to the insertion of a low-level, off-frequency, transmitted RF test signal. The transmitted RF test signal can have any of a variety of characteristics that facilitate measuring the properties of the RF transmission line. Some of the characteristics of the transmission line can be recorded, and measurements taken at any subsequent time, such as months or years later, can be compared to the original recordings to detect gradual changes in the propagation capability of the line. Such a record can permit the entire RF transmission line, and each increment of length thereof, to be characterized when new and to be recharacterized periodically. If warning thresholds are established, then the test system can be configured to alert the operators when the system exhibits evidence of degradation but before the system fails catastrophically, thereby potentially minimizing damage and permitting servicing to be performed at a time of the users' choosing.

As will be evident from the description provided herein, the test signal can be in the RF frequency range and combined with the communication signals/channels to provide a detection signal that is off the frequencies occupied by the signals/channels and of a sufficiently low power to enable monitoring of the transmission line system without interfering with the communication signals/channels. Thereby the present invention enables "on-air" monitoring, or real-time monitoring of the transmission line, obviating the typical "off-air" testing procedures. Also, as will become evident from the discussion below, by combining an off-frequency, lower power test signal with the transmitted signals or channels, trending information on the transmission line health can be obtained. Accordingly, the present invention provides significant advantages over conventional broadcast transmission line testing systems.

Figure 1:
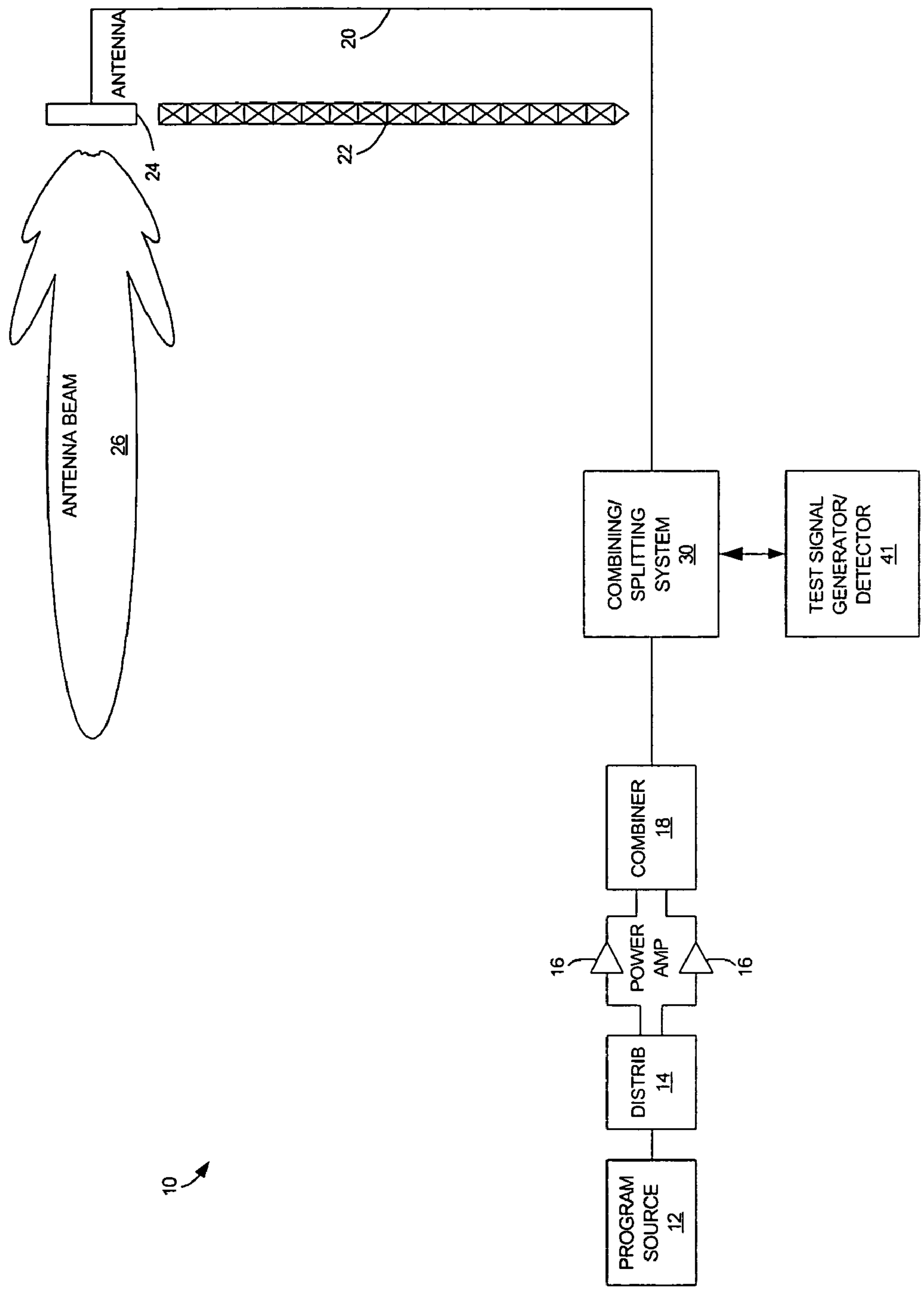
FIG. 1 is a schematic diagram of a signal transmission system incorporating an exemplary embodiment of the detection system.

In one aspect of the inventive apparatus and method, as shown in schematic diagram form in FIG. 1, an RF broadcast system 10 using a transmission line 20 comprises a program source 12, such as one or more continuous, signals from a television studio, each of which may have audio, video, and an RF carrier, or may have digital content with an RF carrier; a distribution device 14 to distribute the program source signal; one or more amplifiers 16; sufficient combiners 18 to collect the signals from all of the amplifiers into a single, high-level signal for broadcast; a transmission line 20 to carry the signals to an assigned point of use such as the top of a tower or equivalent elevated structure 22; and a load such as an antenna 24 that can radiate broadcast signals 26.

To this system 10 the exemplary embodiment can add a first combining/splitting system 30, a test signal generator/detector 41. The combining/splitting system 30 may be facilitated by the use of a shared line tee, as according to design preferences. The generator/detector 41 operates to receive signals from the generator/detector 41 that are reflected from the transmission line 20 via the combining/splitting system 30.

Figure 2:
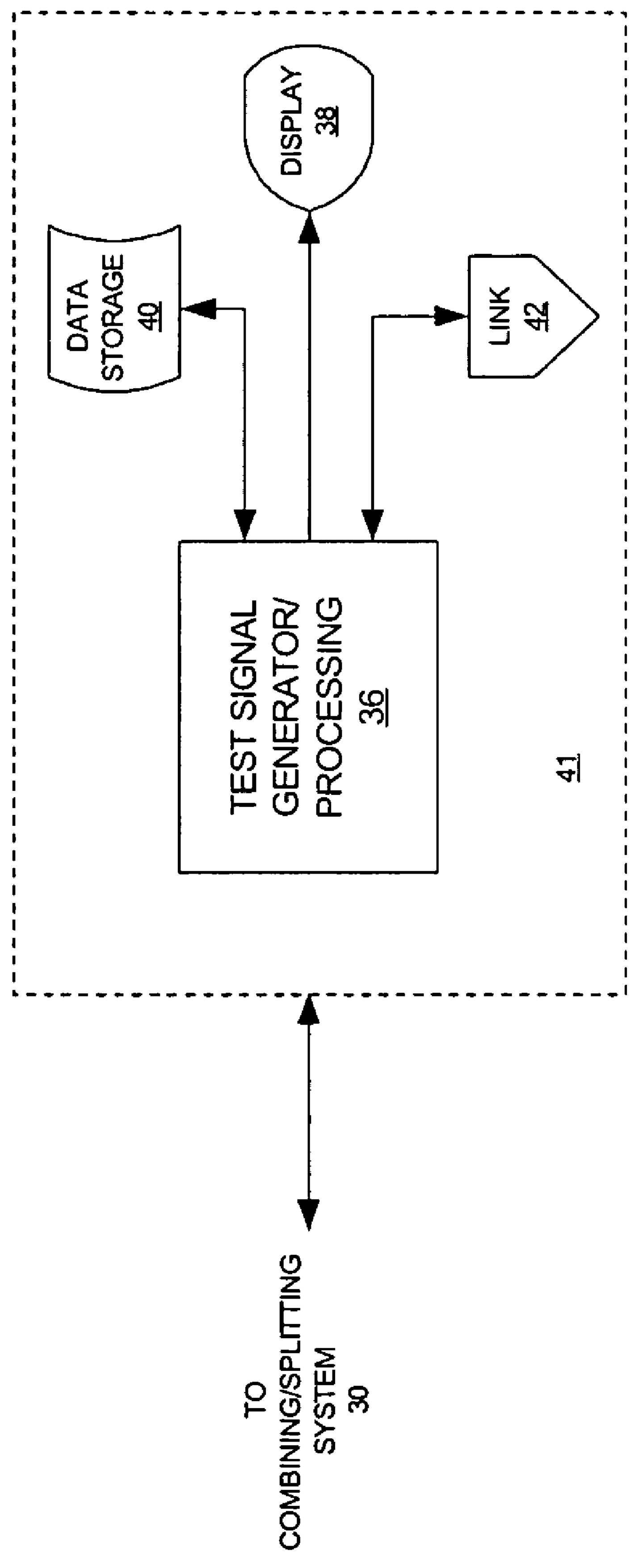
FIG. 2 is a schematic diagram of a signal processing subsystem of an RF signal transmission system incorporating an exemplary embodiment of the detection system.

FIG. 2 shows, in schematic diagram form, one exemplary embodiment of the generator/detector 41 of FIG. 1. The generator/detector 41 may comprise several detecting components, of which may include, for example, an optional high pass filter (not shown), and a signal generator/processing subsystem 36. The signal generator/processing subsystem 36 operates to generate the desired test signals for insertion into the transmission line under test via the combining/splitting system 30 as well as receiving the reflected signals therefrom. It should be appreciated that a network analyzer can provide the functions described by the generator/processing subsystem 36.

The output of the signal generator/processing subsystem 36 can include associated couplers or filters (not shown), data display 38, data storage 40, and a data handling facility such as a remote link 42 for examination, storage, comparison between test events separated in time, and communication with outside resources such as remote processing systems. It should be appreciated that while FIG. 2 illustrates the various elements of the signal generator/processing subsystem 36, data display 38, data storage 40, and remote link 42 as being within the operation of the generator/detector 41, they may separately placed outside the generator/detector 41, according to design preferences. Therefore, modifications to the arrangement and use of various elements of the exemplary embodiment may be made without departing from the spirit and scope of this invention.

The generator/detector 41, with its various components can accomplish functions of acquiring the received RF signals, digitizing (if necessary) the received signals, and performing a correlation function to distinguish reflections from random noise. Reflected signal properties can show both timing and strength of a reflection, corresponding to the location and severity, respectively, of an impedance mismatch in a transmission line.

The functions shown in FIG. 2 may in some instances be substantially the same as those that can be performed by a standard shop instrument such as a network analyzer (NA) or a time domain reflectometer (TDR). For some embodiments, it may be preferable to establish a custom electronics suite, while for other embodiments it may be preferable to use a network analyzer, for example, which may include attenuators, filters, and communications links to an external computer that can handle data storage, statistical analysis, and other relevant tasks.

Figure 3:
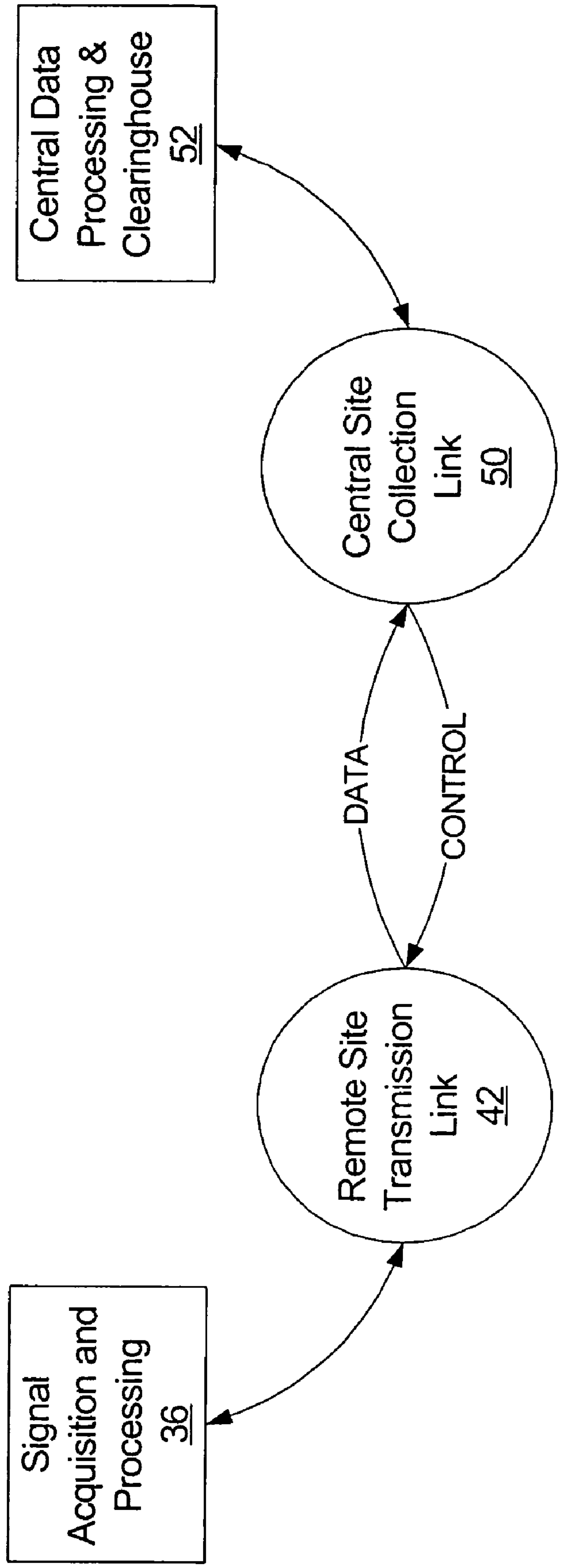
FIG. 3 is a node diagram illustrating an exemplary interconnection supporting a central clearinghouse for management of transmission line status information.

FIG. 3 shows that a signal generator and acquisition and processing subsystem 36 can acquire data concerning a transmission line 20 of FIG. 1 and telemeter that data 42 to another location 50, where the data can be processed 52 for further use. An example of such a location is a central clearinghouse where information concerning one or more transmission lines can be processed and stored, where periodic reports can originate to inform users of the status of the transmission line or lines, and where support services such as repair part orders and work orders can originate. Such a clearinghouse may in some embodiments permit broader analysis, such as failure patterns in individual device types, to be accomplished. The central location can also, in some embodiments, transmit commands, such as instructions to the test apparatus, for control of activities at remote sites.

It should be appreciated that while the various exemplary embodiments detailed above describe the signal generator/detector 41 and the combiner/splitter 30 as being devices having dual capabilities, one of ordinary skill in the art would understand that the dual capabilities can be performed by independent devices. That is, for example, the signal generator/detector 41 may be facilitated by an independent signal generator and an independent signal detector. Additionally, the combining and splitting function of the combiner/splitter 30 can be facilitated by using one-way couplers at disparate locations from each other. Thus, additional flexibility to implementation of the exemplary embodiments described herein, may be accomplished by using independent devices, if so desired.

In some embodiments, the test system can compare the waveform incident on the RF transmission line to the succession of reflections both from mismatches at junctions connecting line sections and from damage to the line between junctions, as might occur from ice, wind-blown object impact, salt corrosion, and the like.

The reflection off the load can be the largest reflection, since, in many embodiments, only a major system fault can produce a mismatch comparable to that of a load such as an antenna. In systems described thus far, this represents the end of the time window of interest, since the function of the test apparatus is to detect defects within the transmission line that cause reflections before the signals are emitted, and any reflections occurring later originated outside the transmission line.

In some embodiments, the inventive apparatus may apply to the antenna or other load device the same evaluation criteria applied to the transmission line. This can allow electrical characteristics of the load device to be examined over time, with changes noted and failures anticipated or observed. This can in turn permit clearinghouse data processing to be extended to antennas and other load devices.

The embodiments herein are described in terms most directly applicable to the use of coaxial lines, but in many instances waveguide can be used for a greater or lesser portion of the signal paths indicated. Particularly for systems in which ultra-high frequency (UHF) transmissions at moderate to high power are required, the process described can enable an effective system realization with either coaxial lines or waveguides.

Other classes of transmission lines aside from the waveguides and rigid coaxial lines used for high-power RF broadcast signal transmission can employ embodiments of this inventive apparatus. The concept may be applied to open-wire transmission lines, such as those used in short wave radio transmission. Open trough transmission lines likewise have known and defined characteristics and in some embodiments can be monitored.

Power transmissions and signals of other types, such as those used in radar and other radiating systems as well as cyclotrons, colliders, and other high-energy research instruments, can likewise employ monitoring, record keeping, analysis, and management functions as herein described.

The many features and advantages of the invention are apparent from the detailed specification; thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to that fall within the scope of the invention.

What is claimed is:

1. An electromagnetic signal transmission line tester, comprising:
- directing means for directing an electromagnetic signal from an electromagnetic signal source to a load;
- test signal means for producing an electromagnetic test signal independent of other electromagnetic signals present within said directing means;
- combining/splitting means for combining/splitting the test signal to and from the directing means;
- detecting means for detecting energy from a reflected test signal from the directing means;
- recording means for recording initial and subsequent propagation characteristics of the directing means; and
- comparing means for comparing recorded characteristics acquired at different times,
- wherein the test signal is of a different frequency than the other electromagnetic signals present within said directing means and of sufficiently low amplitude to not require FCC broadcast licensing approval.

2. The transmission line tester of claim 1, wherein the combining/splitting means is at a source side of the directing means.

3. The transmission line test of claim 1, further comprising:
- tracking means for tracking the differences in recorded characteristics at different times.

4. The transmission line tester of claim 3, further comprising:
- predicting means for predicting further changes in recorded characteristics.

5. A method of testing a transmission line, comprising the steps of:
- transmitting an out-of-channel test signal into the transmission line with a combining/splitting system located proximate to one end of the transmission line;
- receiving reflections of the test signal from the transmission line with said combining/splitting system;
- processing the received reflections to establish a first pattern of time intervals from the original test signal to each reflection;
- comparing the first pattern of time intervals of received reflections to a predetermined reflection pattern thereof;
- storing the first pattern as a characterization of the transmission line at a point in time; and
- characterizing a condition of the transmission line by the magnitude and location of reflections generated by the line in response to the test signal.

6. The method of testing a transmission line of claim 5, wherein the test signal is of a sufficiently low magnitude to not require FCC broadcast licensing approval.

7. The method of testing a transmission line of claim 5, wherein the reflections are received at a detector at another end of the transmission line.

* * * * *